F. A. GILLETTE.
BOLT CUTTING MACHINE.
APPLICATION FILED MAR. 5, 1910.
1,023,013.
Patented Apr. 9, 1912.
3 SHEETS—SHEET 2.
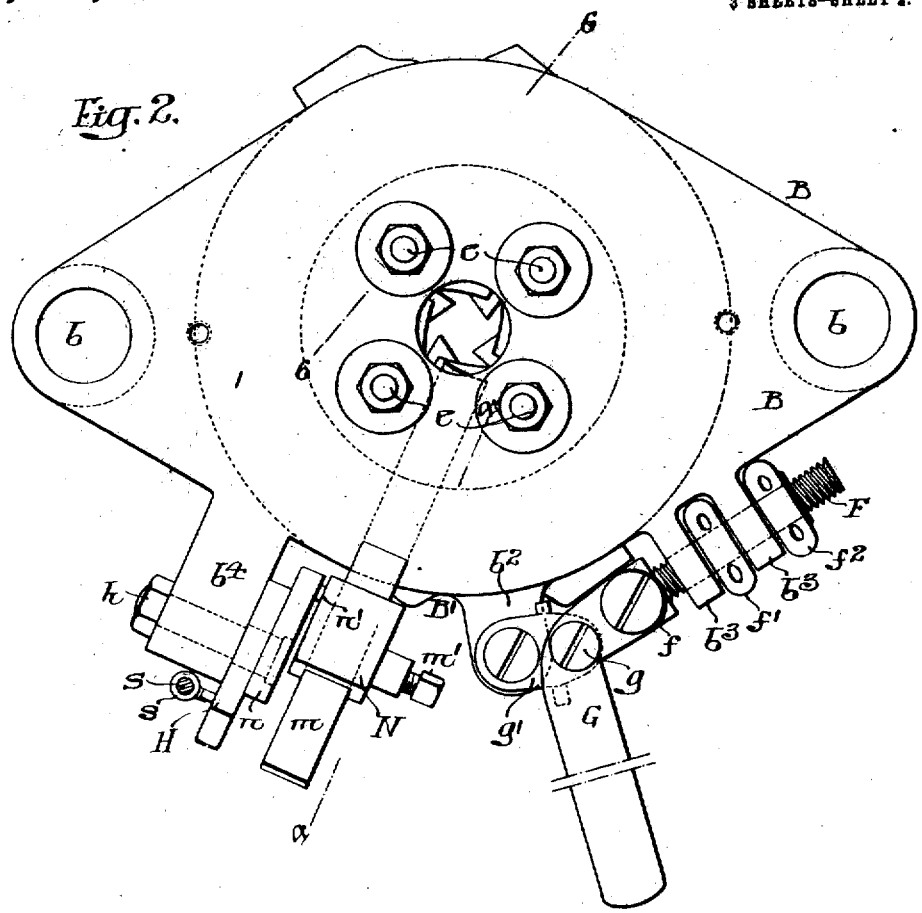
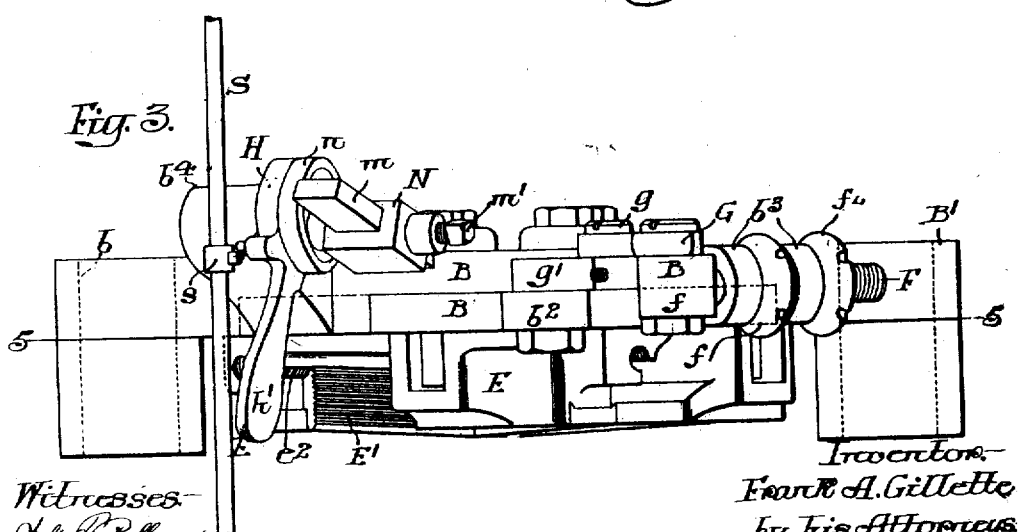

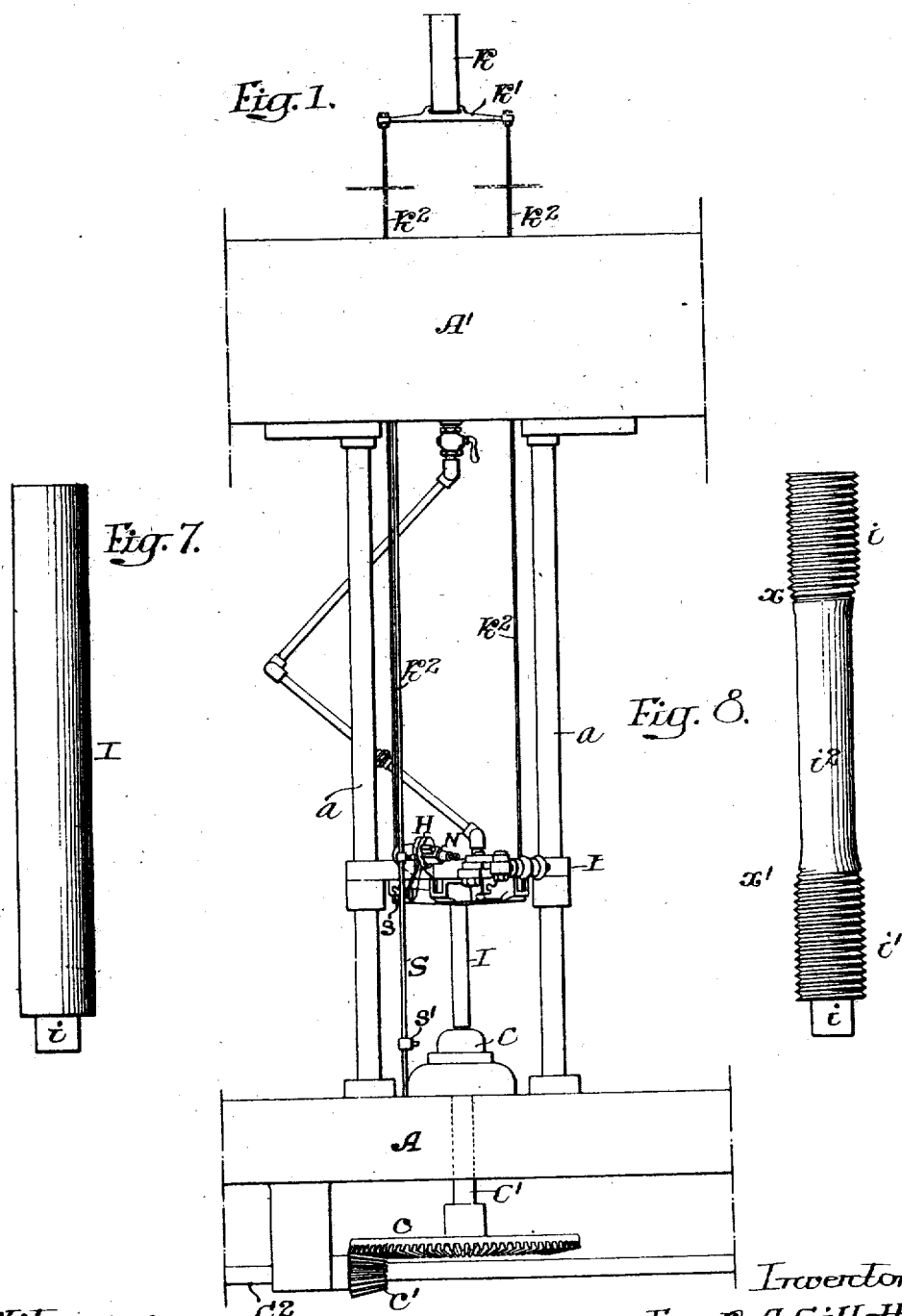

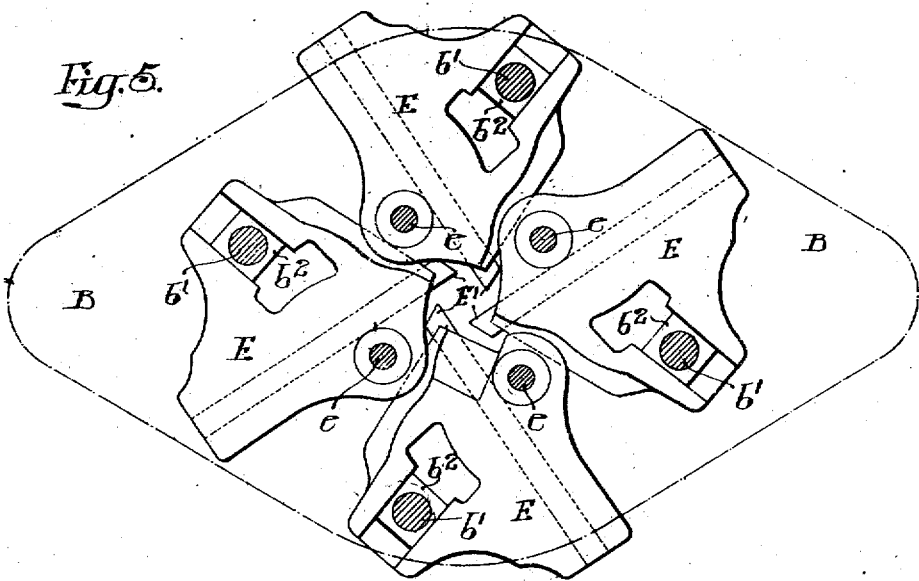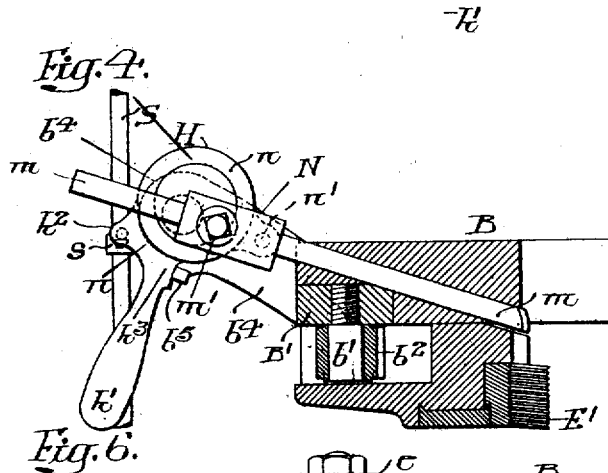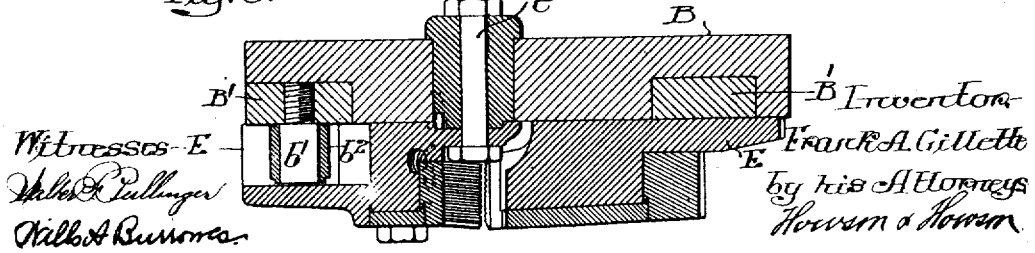

UNITED STATES PATENT OFFICE.

FRANK A. GILLETTE, OF PHILADELPHIA, PENNSYLVANIA.

BOLT-CUTTING MACHINE.

1,023,013.  Specification of Letters Patent.  Patented Apr. 9, 1912.

Application filed March 5, 1910. Serial No. 547,526.

*To all whom it may concern:*

Be it known that I, FRANK A. GILLETTE, a citizen of the United States, residing in Philadelphia, Pennsylvania, have invented certain Improvements in Bolt-Cutting Machines, of which the following is a specification.

My invention relates to certain improvements in bolt cutting machines, especially machines for cutting stay bolts in which there is a screw thread at each end.

The object of my invention is to so construct the cutter that it will cut the threads on the bolt simultaneously with the reducing of the central portion thereof. This object I attain in the following manner, reference being had to the accompanying drawings, in which:—

Figure 1, is a view in elevation illustrating my improved stay bolt cutting machine; Fig. 2, is a plan view of the cutter head; Fig. 3, is a side view of the cutter head; Fig. 4, is a sectional view on the line 4—4 Fig. 2; Fig. 5, is a sectional plan view on the line 5—5 Fig. 3, showing the carriers for the cutters; Fig. 6, is a section on the line 6—6 Fig. 2; Fig. 7, is a view of the stay bolt blank, and Fig. 8, is a view of the finished stay bolt.

A is the base frame of the bolt cutting machine, and A' is the top frame.

$a$—$a$ are two vertical guides on which slides the cutter head B. This cutter head has openings $b$—$b$ at each side through which extend the guides $a$—$a$.

C is the chuck for holding the stay bolt blank I to be cut. This stay bolt blank has a square head $i$ in the present instance, which is adapted to a corresponding opening in the chuck. This chuck is mounted on a vertical shaft C', geared to a driving shaft $C^2$ by gearings $c$—$c'$. The cutter head in the present instance has four die carriers E, each of these die carriers is mounted on a pivot $e$ depending from the cutter head B.

B' is an adjustable ring mounted in an annular groove in the cutter head, depending from this ring are pins $b'$ carrying blocks $b^2$ which are adapted to radial slots $e'$ in the die carriers E, so that when the ring B' is shifted it will turn the die carriers E on their pivots and move the die E' toward and from the center of the die carrier. The dies E' have segmental threads cut in their periphery, as shown in Fig. 3, and cut the threaded portions $i'$ of the bolts. These cutters are held in position by screws $e^2$, Fig. 3.

Projecting from the side of the ring B' is a lug $b^2$, and projecting from the cutter head B are bearings $b^3$, and mounted in these bearings is a screw F having a head $f$, and on the screw between the two bearings $b^3$ is a nut $f'$, and on the outside of one of the bearings is a nut $f^2$ for adjusting the head longitudinally and locking it in the position to which it is adjusted. Pivoted to the head $f$ of the screw F is a lever G, and pivoted to this lever at $g$ is a link $g'$ which is also pivoted to the projecting lug $b^2$ on the ring B', so that on turning the nuts $f'$, $f^2$ the ring can be turned in one direction or the other, which will cause the cutters E to either move toward or from the center of the head to accommodate the die to different size bolts.

$b^4$ is a bracket projecting from the head B and mounted on a pivot pin $h$ in this bracket is an eccentric H having a handle $h'$. Mounted on the eccentric is a strap $n$ having a pin $n'$ engaging a carrier N carrying the cutting tool $m$. This cutting tool is adjustably mounted in the carrier N and is held in position by a set screw $m'$. The cutting tool $m$ is adapted to slide in ways in the head B. The position of the cutter in respect to the threading dies can be regulated by backing off the set screw $m'$, moving the cutter to the position desired. The cutter can be moved bodily into and out of cutting position by operating the lever $b'$ either automatically or by hand.

The cutter head B is preferably counterbalanced and a weight is attached to the counter-balance strap $k$, and this strap is connected to a cross head $k'$ from which extend rods $k^2$. The lower ends of these rods are attached to the cutter head, so that the head is free to move on the vertical guides $a$—$a$, and slightly over-balance the weight, so that it will feed itself after the cutters are once engaged, and when the cutter head reaches the chuck or stop it can be readily raised by the operator and the finished bolt removed and a new one substituted for it. The cutters cut a thread the entire length of the blank, Fig. 7, and when the thread has been partially cut on the blank the cutter $m$ is thrown into position by moving the hand lever $h'$, and this cutter removes the threads between the points x and x', Fig. 8, forming the plain portion i² of the blank, and when the cutter reaches the point x' it may be thrown out by operating the hand lever h" again, so that the balance of the thread remains on the bolt undisturbed and when the thread cutters have completed their work the head is returned to the first position and the finished bolt removed. I prefer to provide means for automatically operating the cutter M and in the present instance S is a tappet rod extending from the upper to the lower frame in close proximity to the cutter head B and on this rod are two adjustable tappets s, s'. On the eccentric H is a pin h¹ which is so positioned as to engage the tappet s on the downward movement of the cutter head, causing the eccentric to turn and move the tool m into cutting position. The gradual outward movement of the tool causes it to cut a taper in the blank, as shown in Fig. 8. This cutting tool will cut the blank until the lower tappet s' strikes the handle h' at h¹, causing the eccentric to again turn and withdraw the tool; this withdrawal is gradual to form a taper at the opposite end of the cut, as illustrated in Fig. 8.

When the bolt is finished and the cutter head returns to its upper position the handle either drops by gravity to the position illustrated in Fig. 4, or is moved by hand; this movement being limited by a stop b⁵ on a bracket b⁴.

Thus it will be seen that the blank is automatically cut; the screw thread being cut from end to end of the blank, and the cutter m is projected and retracted at the proper points to cut the body portion of the bolt.

I claim:—

1. The combination in a cutter head, of a tool carrier, an eccentric strap, a pin connecting the eccentric strap with the carrier and an eccentric upon which the strap is mounted, an arm on the eccentric, and a bracket on the cutter head carrying the eccentric.

2. The combination in a bolt cutting machine, of guides, a head mounted on the guides, a cutter, an eccentric for moving the cutter into and out of position, a tappet rod, tappets on said rod for automatically turning the eccentric to move the cutter into and out of position as the cutter head moves past the tappets.

3. The combination in a bolt cutting machine, of a tappet rod, tappets thereon, guides, a cutter head mounted in said guides, a movable cutter, an eccentric controlling the movement of said cutter, an arm on the eccentric having a pin to engage the first tappet to project the cutter, and a portion of the eccentric adapted to strike the second tappet and still further move the cutter, and a stop on a bracket for limiting the movement of the cutter in the reverse direction.

In testimony whereof, I have signed my name to this specification, in the presence of two subscribing witnesses.

FRANK A. GILLETTE.

Witnesses:
W<sub>M</sub>. E. S<sub>HUPE</sub>,
W<sub>M</sub>. A. B<sub>ARR</sub>.